3,026,267
PROCESS FOR THE PREPARATION OF
SILICA SOLS
Henri G. L. Marcheguet, Amfreville-la-Mi-Voie, and Louis Gandon, Paris, France, assignors to Nobel-Bozel, Paris, France, a company of France
No Drawing. Filed Oct. 22, 1959, Ser. No. 847,862
Claims priority, application France Oct. 30, 1958
6 Claims. (Cl. 252—313)

It is known that it is possible to obtain silica sols (i.e. colloidal solutions of free silica, $SiO_2$), by adding an acid, under certain conditions, to an aqueous solution of an alkali silicate; in this way there is obtained a silica sol which is very impure and consequently very unstable. For example, if a dilute aqueous solution of sodium silicate is poured into hydrochloric acid, the silica is displaced from the sodium oxide and there is obtained a solution of silica, hydrochloric acid and sodium chloride; however, starting from these solutions, the silica separates rapidly in the form of a gelatinous precipitate (called silica gel); in fact the presence of saline electrolytes, such as sodium chloride, causes the electrification with which the granules of silica are charged and which maintains them in colloidal solution, i.e. suspended in the solvent, to disappear.

It is possible to eliminate partially the dissolved electrolytes so as to obtain more stable silica sols but the recommended methods for achieving this result are very complex and very costly. The silica sol is placed, for example, in a dialyzer, formed by a vessel the bottom of which is a parchment membrane immersed in pure water, the renewal of which will have to be provided for. The acid and the salt traverse the parchment whilst a purified silica sol remains in the dialyzer.

Now the applicants have found that the saline electrolytes may be eliminated from silica sols by a very simple process and which only requires currently-used industrial chemical apparatus.

The present invention has for its object to provide a process for the preparation of purified, and thus stable, silica sols.

According to a feature of this process, glyoxal and sulphurous acid are reacted with aqueous solutions of alkali silicates, in such a manner that there is a fixation of the alkali of the silicate with the formation of a sulphite compound of glyoxal.

The process may be conducted in such a manner that, through the action of the acidity contributed by the sulphurous acid, the silica will be displaced from the sodium oxide or the potassium oxide, that the sulphurous acid combines with these bases and that the glyoxal ensures the elimination of the sulphites produced in the form of a complex compound rendered insoluble by appropriate means.

More particularly, the sulphurous acid and the glyoxal may be made to react on the alkali silicate so that there is formation of an acid sulphite ($NaHSO_3$ or $KHSO_3$) and so that the glyoxal combines with this acid sulphite in order to form a bisulphite compound of glyoxal (CHO—CHO·$2NaHSO_3$·$nH_2O$ or
　　　　　　　　　CHO—CHO·$2KHSO_3$·$nH_2O$)

which is capable of being insolubilized quantitatively, the value of $n$ being generally one for the sodium salt and five for the potassium salt.

According to a feature of the present invention, an aqueous solution of glyoxal and sulphur dioxide is prepared, into which there is then introduced an aqueous solution of an alkali silicate so that at least part of the glyoxal is transformed into the bisulphite compound; this bisulphite compound, being sparingly soluble in water, separates; there remains a silicic hydrosol containing only small proportions of the alkali and having an acidic pH; the silica salt obtained is thus freed of the major part of its electrolytes; it is stable and can be preserved.

In a general manner, the aqueous solution of glyoxal and sulphur dioxide is prepared in a molecular ratio of 1:2, which ensures the ultimate transformation of all the glyoxal into bisulphite compound; nevertheless, a smaller proportion may also be used, that is to say putting the sulphur dioxide in excess; similarly, a higher proportion may also be adopted so that finally glyoxal remains in solution in the silicic hydrosol.

For carrying out the process forming the object of the present invention, there is advantage in operating at temperatures at which the solubility of the sulphur dioxide in the aqueous solution of the glyoxal is sufficient, in this case at temperatures lower than 80° C. and, in practice, at temperatures hardly exceeding 20° C.

The greatest durations of stability of the hydrosols are obtained when the operating conditions are such that the bisulphite compound of the glyoxal is completely insolubilized, that is to say that the hydrosol contains only very small proportions of impurities, in particular salts. This result is attained if there is added to the reaction mixture, after precipitation of the bisulphite compound, certain organic compounds with insolubilizing action, such as anhydrous or concentrated lower aliphatic alcohols (methyl, ethyl, or isopropyl alcohol), acetone, glycols, dioxane, methyl acetate, etc. For example, the solubility of the compound of sodium bisulphite and glyoxal, which is about 8% in distilled water at 20° C., becomes practically nil when one of these organic compounds is added; it has been noticed in particular that the bisulphite compound becomes practically insoluble, for example, in aqueous ethyl alcohol of more than 10% by volume. In the case of the compound of potassium bisulphite and glyoxal, the solubility of which is about 3% in distilled water at 20° C., the insolubilization by means of the compounds mentioned is also very easy.

Instead of proceeding as described above, that is to say by adding the silicate to an aqueous solution, previously prepared, of glyoxal and sulphur dioxide, the sulphur dioxide may be first dissolved in water into which is then introduced the silicate and finally the glyoxal, after which there may be added to the reaction mixture a substance with insolubilizing action with respect to the bisulphite compound of the glyoxal; if desired, a little of this substance with insolubilizing action may be added to the water intended for dissolving the sulphur dioxide, and more may be added later on to the reaction mixture.

Although the invention is not connected with any hypothesis or attempt at explanation, it is presumed that the glyoxal, in the sulphurous acid medium, forms 1:2-dihydroxy ethane 1:2-disulphonic acid.

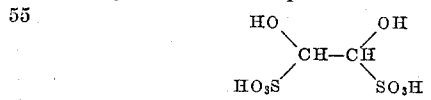

which, with the alkali of the silicate forms the corresponding alkali salt, that is to say the "bisulphite compound" of the glyoxal. Owing to the neutralization of the alkali of the silicate and its elimination in the form of insoluble salt, there remains a very pure solution of silicic acid.

As alkali silicates there may be used any solution of sodium or potassium silicate (even solid sodium metasilicate placed in solution), the molecular ratio of $SiO_2$ to $Na_2O$ or $K_2O$ being as high as possible, as well as the concentration of $SiO_2$; there may be used, for example, a commercial sodium silicate solution, such as the 35–37° Bé. solution, or a 47–48° Bé. solution, or a 24–25° Bé. solution, etc. As regards the sulphurous acid, it is prepared for example, by introducing commercial sulphur dioxide into water (or directly into an aqueous glyoxal solution). The glyoxal may be used, for example, in the form of aqueous commercial solutions or also in the form of powdered polyglyoxal or crystallized glyoxal hydrate.

The concentrations of the reagents (sulphurous acid, glyoxal, silicate, and insolubilizing substance) are to be chosen in such a manner that the bisulphite compound of the glyoxal which is formed is at a concentration greater than 5 g. per litre in the reaction medium.

In place of the glyoxal there may be used derivatives of this compound which are capable of forming, like glyoxal, bisulphite compounds, in particular methyl glyoxal ($CH_3$—CO—CHO), glyoxylic acid (HOOC—CHO) and its salts. In the case of glyoxylic acid it is preferred to use one of its salts, for example sodium glyoxalate and it is advantageous to proceed in such a manner that there is formed an alkali bisulphite compound such as $$NaOOC—CHO \cdot NaHSO_3$$

In the case of methylglyoxal the procedure is preferably such that there is formed an alkali bisulphite compound such as $CH_3$—CO—CHO·$2NaSO_3$.

The process carried out according to the present invention contributes a great technical advance in comparison with the known processes, by virtue of the following advantages with which it is connected:

All the operations may be effected at ordinary temperatures;

Silicic hydrosols of exceptionally high concentration may be obtained directly (owing to the very great solubility of the sulphur dioxide in the glyoxal);

Excess acidity may easily be eliminated if desired, which ollows the preparation of very weakly acid hydrosols;

The process of preparation is of great simplicity and is constantly reproducible;

The bisulphite compound of the glyoxal represents a by-product of great value, glyoxal and its derivatives being products which are greatly sought after in the present state of the art; on the other hand, this bisulphite compound is extremely easy to separate from the reaction medium owing to its particular crystalline structure;

The cost price of the process is very small.

The silica sols obtained by the process according to the invention are sufficiently pure and stable for all industrial uses; a practically limitless stability may be conferred on them by making them alkaline (that is to say by bringing them to a pH greater than 7) by a known process but avoiding the simple neutralization connected with the alkalization, in order to avoid a substantial production of saline electrolytes; preferably peptization or passage through an anion exchanger is adopted.

There will now be given by way of illustration, but not in any limitative sense, several examples of the carrying out of the process forming the object of the present invention:

*Example 1*

187.5 g. of a 31% by weight commercial solution of glyoxal are mixed with water so as to give a total volume of 750 ml.

Into this solution sulphur dioxide is bubbled, with external cooling by means of running water, until the increase in weight has reached 132 g.

Into the acid solution obtained, and which is maintained at a temperature of about 17° C. by an external circulation of running water, there is poured slowly, with slight stirring, 1000 ml. of an aqueous solution containing 810 g. of 35–37° Bé. sodium silicate (titrating 24.65% of $SiO_2$ and having a ratio of $SiO_2$:$Na_2O$ of 3.22).

After 30 minutes, 320 g. of ethanol are added.

The precipitate of bisulphite compound of glyoxal which has the formula  is separated, for example by ordinary filtration or filtration by suction, it weighs, after drying, 276 g., being 97% of the theoretical amount.

The hydrosol collected has the following properties:

| | |
|---|---|
| $SiO_2$ content _____percent__ | 10.1 |
| Dry residue content, after elimination of the silica _____percent__ | 0.2 |
| pH _____ | 2.7 |

This silica sol is sufficiently stable and capable of preservation for all industrial uses; a practically limitless stability may be conferred on it by alkalization by any known process which is not susceptible of producing substantial quantities of alkali electrolytes.

*Example 2*

The procedure is exactly the same as in Example 1 except that 250 g. of isopropanol are added in place of the 320 g. of ethanol.

The precipitate of the bisulphite compound of the glyoxal weighs 280 g., being about 99% of the theoretical quantity.

The hydrosol collected has the following properties:

| | |
|---|---|
| $SiO_2$ content _____percent__ | 11.9 |
| Dry residue content, after elimination of the silica _____percent__ | 0.2 |
| pH _____ | 3.1 |

This silica sol is sufficiently stable and capable of preservation for all industrial uses; a practically limitless stability may be conferred on it by alkalization by any known process which is not susceptible of producing substantial quantities of alkali electrolytes.

*Example 3*

Into a receptacle cooled to about 0° C. there are introduced 300 g. of denatured ethanol and 700 g. of water. Into this sulphur dioxide is bubbled up to maximum absorption, being 720 g. of $SO_2$.

There are then added, with stirring, 6720 g. of 24–25° Bé. sodium silicate, titrating 18% of $SiO_2$ and having an $SiO_2$/$Na_2O$ ratio of 3.24.

Into this solution there are added slowly, with continued stirring and cooling, 640 g. of a 50% aqueous solution of glyoxal. Finally, a further 4,000 g. of denatured ethanol are added and it is allowed to cool while continuing the stirring.

The precipitate of the bisulphite compound of the glyoxal is separated, for example by filtration or removal by suction; it weighs, after drying, 1,436 g.

The hydrosol collected (14,240 g.) has the following properties:

| | |
|---|---|
| $SiO_2$ content _____percent__ | 7.7 |
| Dry residue content, after elimination of the silica _____percent__ | 0.3 |
| pH _____ | 3.8 |

This silica sol is sufficiently stable and capable of preservation for all industrial uses; a practically limitless stability may be conferred on it by alkalization by any known process which is not susceptible of producing substantial quantities of alkali electrolytes.

*Example 4*

Into a receptacle provided with a cooling system, there are introduced 1,450 ml. of an aqueous solution of glyoxal containing 200 g. of CHO—CHO per litre.

With the temperature maintained at 15–16° C., sulphur dioxide is bubbled into this solution until 660 g. of $SO_2$ have been introduced.

Into the acid solution obtained there is poured slowly, with stirring and cooling, a potassium silicate solution constituted by:

4,400 g. of commercial potassium silicate solution containing—

SiO$_2$ _____ percent by weight__ 23.1
K$_2$O _____ do_____ 10.6 the molecular ratio SiO$_2$/K$_2$O of which is thus equal to 3.41.

1,900 g. of water.

At the end of the addition the temperature has risen to 20° C. 800 g. of isopropyl alcohol are added. The bisulphite compound of the glyoxal crystallizes immediately. Cooling to 15–16° C. is effected again and then filtration by suction is effected. Washing with 500 ml. of 10% isopropyl alcohol is then effected. There are recovered, after drying of the solid product:

1,905 g. of the bisulphite compound of glyoxal of the formula CHO—CHO·2KHSO$_3$·5H$_2$O
6,280 g. of solica sol having the following properties:

SiO$_2$ content _____ percent__ 16.0
K$_2$O content _____ do____ 0.4
pH _____ 3.5

The silica sol obtained is perfectly clear and limpid; it is sufficiently stable and conservable for all industrial uses; a practically limitless stability may be conferred on it by alkalization by any known process which is not susceptible of producing substantial quantities of alkali electrolytes.

*Example 5*

Into a receptacle provided with a cooling system there are introduced 1,212 g. of an aqueous solution of glyoxal containing 30% of CHO—CHO.

With the temperature maintained at 18–20° C., sulphur dioxide is bubbled into this solution up to saturation. The total quantity of SO$_2$ introduced at this time is 445 g.

Into the acid solution thus obtained, there is poured slowly, with stirring and cooling, a solution of sodium silicate constituted as follows:

1,900 g. of a 47–48° Bé. aqueous solution of sodium silicate containing—

SiO$_2$ _____ percent by weight__ 32.1
Na$_2$O _____ do_____ 11.4 the molecular ratio SiO$_2$/Na$_2$O of which is thus equal to 2.92.

A quantity of water sufficient to bring the volume to 2 litres.

There are then added 3,000 ml. of methyl alcohol. The bisulphite compound of the glyoxal crystallizes; it is separated by filtration by suction. There are recovered, after drying off the solid product:

995 g. of the bisulphite compound of glyoxal of the formula CHO—CHO·2NaHSO$_3$·H$_2$O
5,150 ml. of silica sol having the following properties—

SiO$_2$ content _____ g./litre__ 131
Na$_2$O content _____ do____ 1.4
pH _____ 2.3

The silica sol obtained, which still contains glyoxal in solution, is perfectly clear and limpid; the presence of the glyoxal confers particularly interesting properties to this silica sol; it may be used, for example, for the treatment of certain coatings having a carboxymethylcellulose base, a polyvinyl chloride base and the like, to which it confers a remarkable behaviour in the presence of water.

*Example 6*

This example is carried out with very pure substances, by way of trial.

Into a receptacle provided with a cooling system there is introduced 1 litre of an aqueous solution of glyoxal containing 216 g. per litre and 150 ml. of water are added.

With the temperature maintained at 15–16°, sulphur dioxide is bubbled into this solution until 510 g. of SO$_2$ have been introduced.

Into the acid solution thus obtained there is poured slowly, while stirring and cooling to maintain the temperature between 15 and 30° C., a solution of potassium silicate constituted by:

3,230 ml. of 28° Bé. aqueous potassium silicate containing—

SiO$_2$ _____ g./litre__ 236
K$_2$O _____ do____ 112 the molecular ratio SiO$_2$/K$_2$O of which is thus equal to 3.30.

270 ml. of water.

At the end of the addition, the temperature has risen to 34° C. There are then added progressively 5 litres of isopropyl alcohol and it is allowed to cool, with stirring, to 15° C. The bisulphite compound of glyoxal separates by crystallization; it is recovered by filtration by suction and washing with 50% isopropyl alcohol.

There are recovered after drying of the solid product:

1,108 g. of the anhydrous bisulphite compound of glyoxal of the formula CHO—CHO·2KHSO$_3$
10 litres of silica sol having the following properties—

SiO$_2$ content _____ g./litre__ 73.8
K$_2$O content _____ do____ 0.025
pH _____ 4.5

The silica sol obtained is perfectly clear and limpid; it is sufficiently stable and conservable for all industrial uses; a practically limitless stability may be conferred on it by alkalization by any known process which is not susceptible of producing substantial quantities of alkali electrolytes.

*Example 7*

Into a receptacle provided with a cooling system, there are introduced 568 g. of an aqueous solution of glyoxal containing 10.2% by weight of glyoxal.

With the temperature maintained between 15 and 20° C., sulphur dioxide is bubbled into this solution until 134 g. of SO$_2$ have been introduced.

Into the acid solution obtained there are poured slowly, while stirring and maintaining the temperature by cooling at about 170 C.:

1,653 g. of a 24–25° Bé. aqueous solution of sodium silicate containing—

SiO$_2$ _____ percent by weight__ 15.35
Na$_2$O _____ do____ 3.75 the molecular ratio SiO$_2$/Na$_2$O of which is thus equal to 4.23.

There are then added 540 g. of ethylene glycol.

The bisulphite compound of the glyoxal, which crystallizes, is separated by filtration by suction. There are recovered, after drying of the solid product:

282 g. of the bisulphite compound of the glyoxal of the formula CHO—CHO·2NaHSO$_3$·H$_2$O
2,600 g. of silica sol having the following properties—

SiO$_2$ content _____ percent by weight__ 18.28
Na$_2$O content _____ do____ 0.4
pH _____ 3.8

The silica sol obtained is sufficiently stable and conservable for all industrial uses; it may even be concentrated up to 20–25% by weight (for example, under reduced pressure) without there being any decrease in its stability. A practically limitless stability may be conferred on it by alkalization by any known process which is not susceptible of producing substantial quantities of alkali electrolytes.

What we claim is:

1. In the production of a silica hydrosol, the step of mixing at a temperature below 80° C. an aqueous alkali metal silicate solution with sufficient amounts of sulfurous acid and glyoxal to cause substantially the whole alkali metal content of said solution to combine with said sulfurous acid and glyoxal into an alkali metal bisulfite compound of glyoxal.

2. The process of claim 1, said aqueous alkali metal silicate solution being added to a previously formed aqueous solution of sulfurous acid and glyoxal.

3. The process of claim 1, said aqueous alkali metal silicate solution being added to a previously formed aqueous solution of sulfurous acid, glyoxal being added afterwards.

4. The process of claim 1, comprising the additional subsequent step of adding a sufficient amount of an insolubilizing agent for said bisulfite compound of glyoxal to the mixture obtained for precipitating the whole amount of said bisulfite compound, said insolubilizing agent being selected from the class consisting of anhydrous and concentrated lower alkanols, acetone, ethylene glycol, dioxane and methyl acetate.

5. In a process for the production of a silica hydrosol, the steps of gently stirring an aqueous solution of sulfurous acid and glyoxal, and slowly introducing a sufficient amount of an aqueous alkali metal silicate solution into the first-named solution to cause substantially the whole amount of alkali metal content of the second-named solution to combine with said sulfurous acid and glyoxal into an alkali metal bisulfite compound of glyoxal, while cooling said first-named solution to a temperature not above 20° C.

6. In a process for the production of a silica hydrosol, the steps of maintaining an aqueous solution of sulfurous acid at a temperature not above 20° C., introducing into said solution at said temperature an amount of an aqueous alkali metal silicate solution corresponding to no more than one equivalent of alkali metal per mol of sulfurous acid while stirring, then slowly introducing into the mixture thus formed, at said temperature and while still stirring, an amount of an aqueous solution of glyoxal corresponding to not less than one mol of glyoxal per two equivalents of alkali metal, so as to cause substantially the whole alkali metal content of said alkali metal containing solution to combine with said sulfurous acid and said glyoxal into an alkali metal bisulfite compound of glyoxal.

References Cited in the file of this patent

UNITED STATES PATENTS

| | | |
|---|---|---|
| 2,276,314 | Kirk | Mar. 17, 1942 |
| 2,377,842 | Marshall | June 5, 1945 |
| 2,414,858 | Davidson | Jan. 28, 1947 |
| 2,605,228 | Alexander et al. | July 29, 1952 |
| 2,726,216 | Kimberlin | Dec. 6, 1955 |

OTHER REFERENCES

"Organic Chemistry" (Fieser et al.), published by Heath and Co. (Boston), 1944, (pages 206–9 relied on).